United States Patent [19]
Havlovitz et al.

[11] Patent Number: 5,842,648
[45] Date of Patent: Dec. 1, 1998

[54] MOLDED BROADCAST SPREADER

[75] Inventors: Paul M. Havlovitz, Escondido; Aaron D. Delaby, Carlsbad; Albert C. Martinez, Vista, all of Calif.

[73] Assignee: Republic Tool & Mfg. Corp., Carlsbad, Calif.

[21] Appl. No.: 774,491

[22] Filed: Dec. 30, 1996

[51] Int. Cl.⁶ .................................................. A01C 17/00
[52] U.S. Cl. ...................... 239/650; 222/609; 222/625; 239/666; 239/685; 239/687
[58] Field of Search ...................... 222/609, 613, 222/623, 624, 625; 239/650, 665, 666, 668, 685, 687, 681, 518, 524

[56] References Cited

U.S. PATENT DOCUMENTS

| | | | |
|---|---|---|---|
| 4,106,704 | 8/1978 | McRoskey et al. | 222/625 X |
| 4,511,090 | 4/1985 | Morgan | 239/666 |
| 4,597,531 | 7/1986 | Kise | 239/650 |
| 4,671,434 | 6/1987 | Johnston et al. | 222/625 |
| 5,294,060 | 3/1994 | Thompson | 239/687 X |

*Primary Examiner*—Kevin P. Shaver
*Attorney, Agent, or Firm*—Harry Williams

[57] ABSTRACT

A broadcast spreader constructed from two separate and rotationally molded parts; one molded part integrates the handle and hopper assemblies while the other molded part forms the base assembly that supports the wheels for the spreader. A pair of dovetail-like connection between the molded parts assures a strong and tight fit and proper alignment therebetween. Also provided are a self-aligning bearing for the rotor shaft and a single control for simultaneously operating a deflector plate and an auxiliary dispensing member for the spreader.

10 Claims, 4 Drawing Sheets

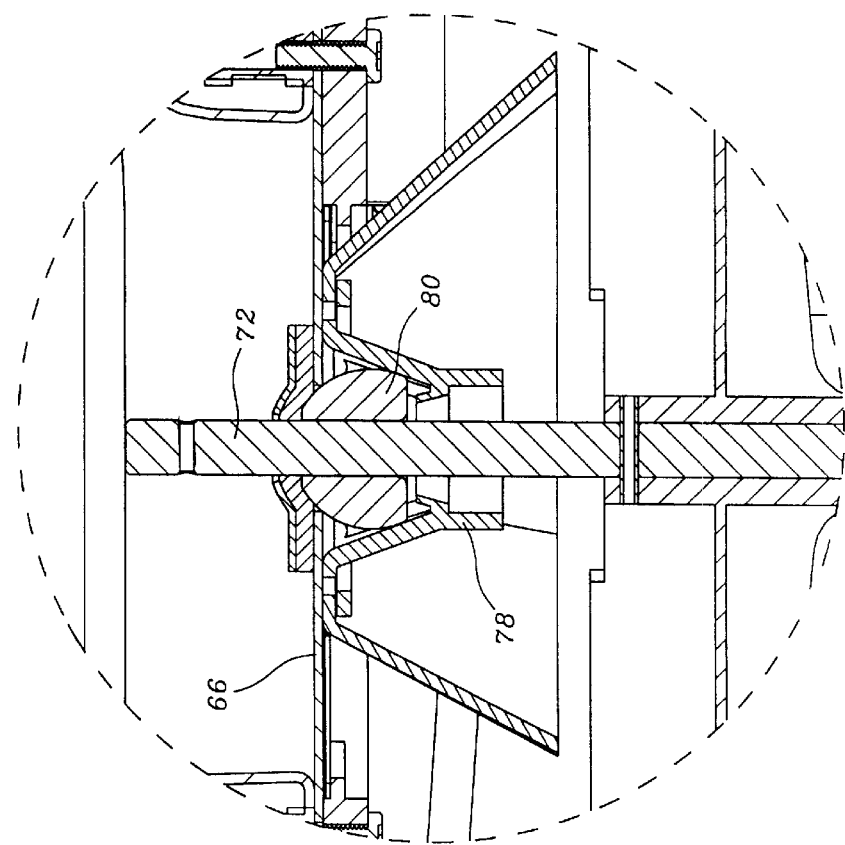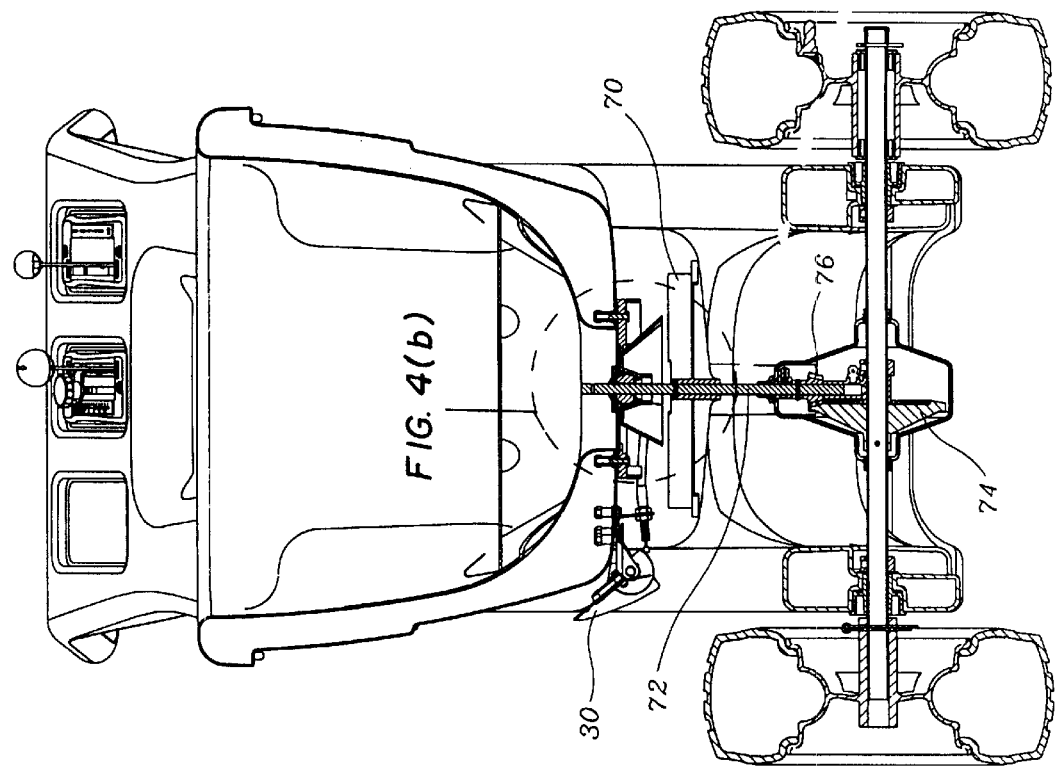

MOLDED BROADCAST SPREADER

BACKGROUND OF THE INVENTION

The present invention relates generally to wheeled broadcast spreaders of the ambulatory kind that are designed to be manually pushed for agricultural use, that is, for the purpose of broadcasting seed or fertilizer or some such other soil-treating granular material from a filled hopper.

Specifically, there is a present need in the field of spreaders and broadcast spreaders in particular to which the present invention is addressed for improvements in cost, simplicity and sturdiness of construction, accuracy and efficiency of performance, and strength and durability under the most exacting of working conditions in an agricultural environment.

OBJECTS AND SUMMARY OF THE INVENTION

It is a primary purpose and principle object of the present invention to address the aforementioned needs and provide a therefore a heavy-duty broadcast spreader that is sturdily constructed from a few simple parts and which provides for accurate control for spreading the broadcast material, whether it be fertilizer, seed, or other granular material having an agricultural use.

It is another object of the present invention to provide a molded spreader of the broadcast kind that uses only two main molded parts for incorporating the three basic parts to a spreader, namely, a handle assembly, a hopper assembly and a wheel base assembly.

It is yet another object of the present invention to provide a molded spreader of the broadcast kind that makes use of rotationally molded plastic parts.

It is still another object of the present invention to provide a molded plastic spreader in which the handle and hopper assemblies form a single molded part and are joined by a simple slide-in connection to a base assembly for supporting the wheels.

It is yet another object of the present invention to provide a spreader of the broadcast kind that combines two molded parts in which a simple connection assures proper alignment between the parts.

It is still another object of the present invention to provide a broadcast spreader which has a self-aligning rotor shaft bearing that compensates for possible misalignment or non-perpendicularity between the wheel axle and the rotor shaft.

It is yet another object of the present invention to provide a broadcast spreader which combines the operation of an auxiliary shutoff device and a side-deflector plate by means of a single control lever, which feature allows intentional blockage of the broadcast spread pattern on one side of the spreader.

It is still another object of the present invention to provide a spreader which uses an ergonomically designed handle that allows the user to grip the handle in two different positions.

According to one embodiment of the present invention there is provided a broadcast spreader which is constructed from two basic molded parts; one molded part integrates the handle and hopper assemblies while the other molded part forms the base assembly that supports the wheels for the spreader. A dovetail-like connection between the molded parts assures a strong and tight fit and proper alignment therebetween.

The invention will be better understood as well as further objects and advantages thereof become more apparent from the ensuing detailed description taken in conjunction with the drawings.

BRIEF DESCRIPTION OF THE DRAWINGS

FIG. 4A is schematic cross-sectional view of the broadcast spreader according to the invention; and FIG. 4B is an enlarged detail of the broadcast spreader according to the invention.

DETAILED DESCRIPTION

Figure 1:
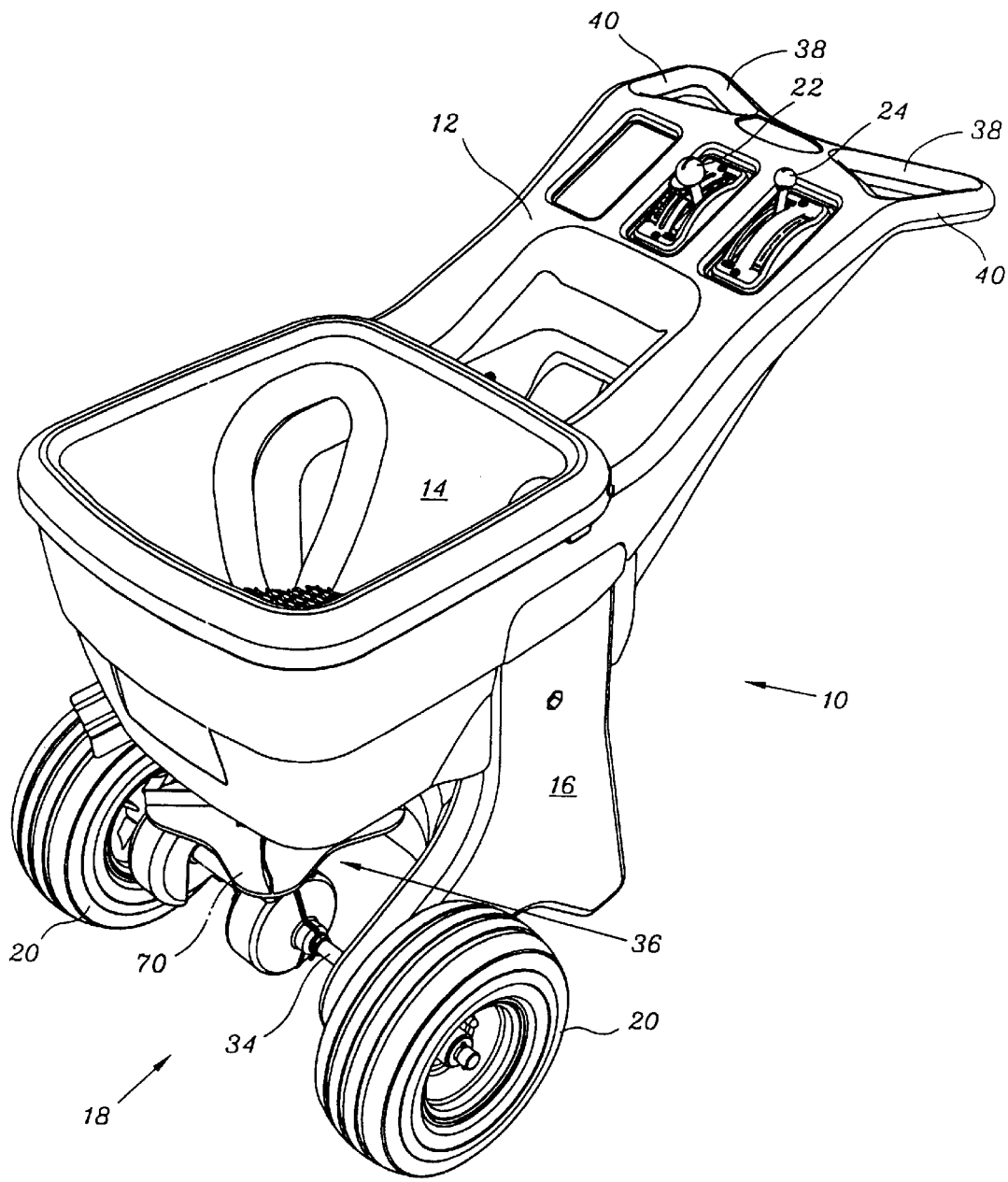
FIG. 1 is a schematic perspective view from the top of the broadcast spreader according to the invention.
Figure 2:
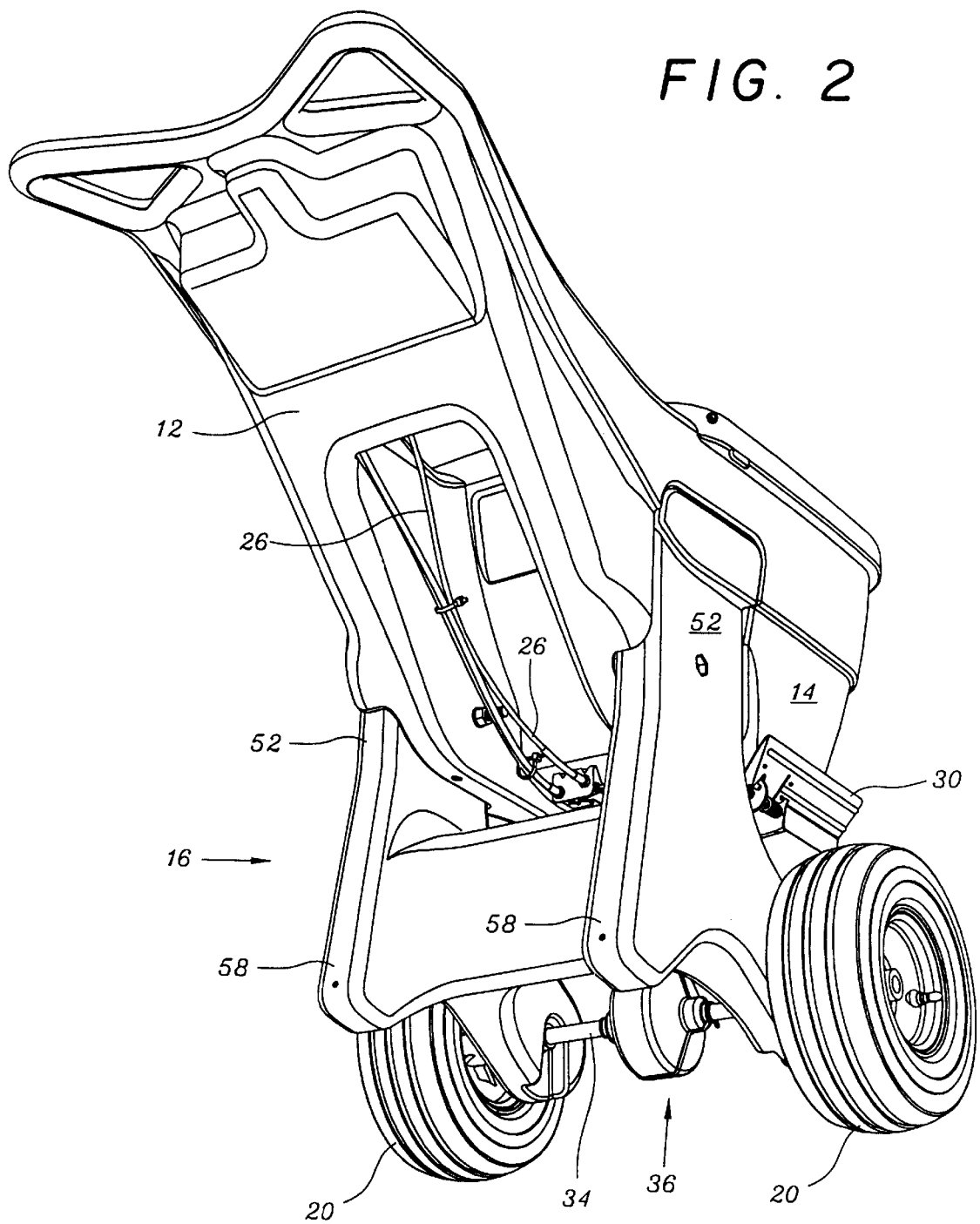
FIG. 2 is a schematic perspective view from the bottom of the broadcast spreader according to the invention.

Referring now to FIGS. 1 and 2, there is shown the broadcast spreader generally as 10 with a handle/hopper assembly 12, a hopper 14 and a base assembly 16 which supports the wheel assembly 18, including a pair of wheels 20 which are preferably pneumatic tires that provide traction and cushioned support for the spreader. Also shown generally and to be described in fuller detail below are the manually operated pivotable control handles 22 and 24, the former controlling the shutoff plate for controlling the dispensing of soil-treating material, such as fertilizer, seed and the like from the hopper by means of cable 26, which plate slides within a hopper floor plate to be discussed below, and the latter combining two functions, controlling the auxiliary shutoff plate 68 for the hopper 14 by means of cable 28 and actuating the deflector plate 30 (see FIG. 2) by means of cable 32. Also shown is a gear box supported by wheel axle 34 and driven thereby in the conventional manner for driving a rotor assembly 36 when the axle rotates. Details of the rotor assembly and shutoff plate assembly, which form no part of the present invention, and which include an adjustable cone-shaped deflector member as well, are described in full in the U.S. Pat. No. 4,597,531, to Kise, whose disclosure is incorporated herein by reference.

With further reference to FIG. 1, the handle assembly 12 is seen to incorporate an ergonomic handle design that allows the operator to grip the handle in two different places, namely at the respective crossbar sections 38 or on the respective sidebar sections 40.

Figure 3:
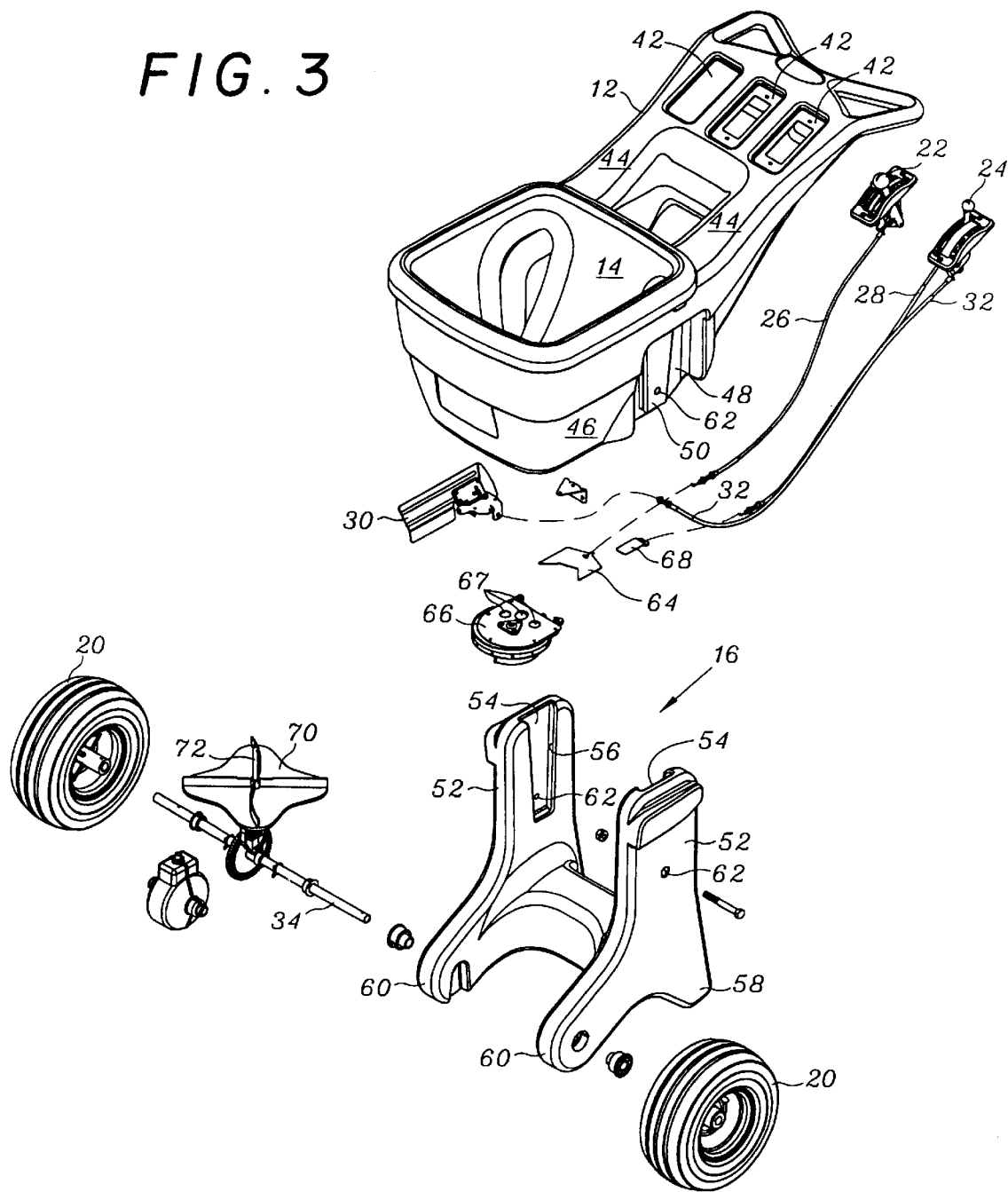
FIG. 3 is a schematic exploded view of the broadcast spreader shown in FIG. 1.

FIG. 3 shows the separate molded parts that form the spreader according to the principles of the invention, together with the manual controls for the shutoff plate, the auxiliary shutoff plate 68 and the deflector plate 30. Each of the molded sections, that is the handle/hopper assembly 12 and the base assembly 16 are molded by conventional molding techniques, specifically by the technique known as rotational molding and more fully described in a booklet put out by the Association of Rotational Molders, Oak Brook, Ill., 1993, entitled "Rotational Molding: The Introductory Guide to Designing Rotationally Molded Plastic Parts." As shown, the handle/hopper assembly is all one piece and includes three instrument panel areas 42, two of which are used for receiving the manual controls used with the invention, a pair of arm support members 44, which transform into the hopper 14 itself. Opposing sidewalls 46 of the hopper 14 are seen to have an elongated recessed area 48 (only one of which is shown) that has on its face an elongated bracket 50 in the shape of a trapezoid whose side faces are sloped inwardly as they move from the plane of the outside face of the bracket to the plane of the recessed area 48.

The base assembly 16 is seen to have two upstanding leg members 52, each of which are defined on the inside surface thereof with recessed areas 54 complementing the trapezoidal shape of the brackets 50, above described with respect to the sidewalls of the hopper assembly. Each of the side faces 56 of the recessed areas is sloped in the same direction as the sloped side faces of the brackets 50 so that the leg members then can be mounted to the side walls 46 of the handle/hopper assembly 12 by means of the dovetail connection between the brackets 50 and the recessed areas 54 in the respective leg members 52 of the base member 16. The base assembly 16 is also seen to have a pair of support leg members 58 upon which the completed assembly rests when not in use. Forward of the rest members 58 are a pair of leg extension members 60 which receive and rotatably support the wheel axle 34, as best shown in FIG. 1. Once the base assembly is secured to the hopper/handle assembly, suitable bolts can be mounted in the through holes 62 extending through the leg members 52 and side walls 46 of the hopper 14. In this way the base assembly is secured tightly and firmly to the hopper/handle assembly by virtue of the elongated dovetail connections which are elongated along an axis normal to the axis of the load-bearing wheel axle 34, thus assuring as well a proper alignment between the two assemblies. While it is preferred that the two joined assemblies are the handle/hopper assembly and the base assembly, it not outside the concept of the invention to have the two assemblies comprise, say, a base/hopper assembly and a handle assembly in which the handle assembly could be joined to the hopper/base assembly in the manner described above for joining the hopper/handle assembly and the base assembly.

With further reference to FIG. 3, it will be seen that the manual control handles 22 has one cable 26 attached thereto which leads to the shutoff plate 64 that cooperates with the floor plate 66 for controlling the flow of material from the hopper, which feature is more fully described in the Kise patent referred to above. The other manual control handle 24 is connected to the two cables 28 and 32 and operates them simultaneously to control respectively rotation of the deflector plate 30 and sliding of the auxiliary shutoff plate 68 within the floor plate 66 which separately controls open and closure of one of the dispensing apertures 67 therein. While each of these separate functions are by themselves well known, it is not known to combine their functions with a single control as in the present case. Referring to FIG. 4 the deflector plate 30 is seen to be pivoted to the bottom side of the hopper 14 and is spring-biased to an open or up position in which it does not interfere with the throw of material off the rotor plate 70. As is well known, when the deflector plate 30 is caused to rotate to a downward position it blocks the flow of material coming off the rotor plate on that side of the hopper and so allows the operator to block the throw of material to the area of ground on that side of the hopper. By also controlling the auxiliary shutoff plate 68 simultaneously with actuating the deflector plate 30, the user automatically cuts down on the flow of material to the rotor plate when he or she operate the manual control 24 and thereby lessens the amount of material thrown up against the deflector plate 30.

Referring to FIG. 4 again, a rotor shaft 72 is shown connecting the ring gear 74 by means of a pinion gear 76 fixed thereon to thereby turn the rotor plate 70 in the conventional manner. Supporting the rotor shaft 72 at the upper end is a bearing mount support member 78 in the floor plate 66 (shown as well in the Kise patent). The bearing therein, however, is unique to the present invention and takes the form of a spherical bearing 80, as shown, so that the upper end of the rotor shaft extending therethrough is allowed enough play by virtue of the spherical bearing's ability to rotate within its mount 78 to thereby compensate for any misalignment between the wheel axle and the rotor shaft in case the two do not exhibit a proper or perfect perpendicularity therebetween once assembled.

The foregoing relates to a preferred exemplary embodiment of the present invention, it being understood that other embodiments and variants thereof are possible within the scope of the invention, the latter being defined by the appended claims.

What is claimed and desired to be secured by Letters Patent of the United States is:

1. A two-part spreader for dispensing soil-treating materials comprising, a handle assembly and a hopper assembly formed from a first molded member having a connector means integral therewith, a base assembly including a pair of leg members formed from a second molded member having a connector means integral therewith, a wheel assembly supported by said pair of leg members, a dispensing means disposed at the bottom of said hopper, a drive means connected to said wheel assembly for driving a rotor plate disposed below said dispensing means, control means on said handle assembly connected to said dispensing means, and said connector means of said first molded member cooperating with said connector means of said second molded member to rigidly secure together said first and second molded members to thereby form said two-part spreader.

2. A spreader according to claim 1, wherein said connector means of said first molded member is an elongated bracket member disposed on an exterior portion of said hopper assembly, and said connector means of said second molded member is a receptacle means disposed on said base assembly complementing the shape of said elongated bracket member for forming a dovetail connection therebetween.

3. A spreader according to claim 2, wherein the long axis of said elongated bracket means is generally perpendicular to the axis about which said wheel assembly rotates.

4. A spreader according to claim 1, wherein said first molded member and said second molded member are formed by a rotational molding process.

5. A spreader according to claim 1, wherein said base assembly includes a pair of support leg members for supporting said spreader in a rest position.

6. A spreader for dispensing soil-treating materials comprising, a handle assembly, a hopper assembly and a base assembly, a wheel assembly supported by said base assembly, a drive means connected to said wheel assembly, a rotor plate connected to said drive means, a dispensing means and an auxiliary dispensing means disposed at the bottom of said hopper assembly, a deflector means pivotally disposed at the side of said hopper assembly for partially blocking the throw of materials from said rotor plate, a first control means on said handle assembly connected to said dispensing means, a second control means on said handle assembly connected to said auxiliary dispensing means, a third control means on said handle assembly connected to said deflector means for pivoting said deflector means from an inoperable to an operable position, and a single lever means connecting said second control means and said third control means, whereby operation of said single lever closes said auxiliary dispensing means simultaneously with pivoting said deflector means into said operable position.

7. A spreader according to claim 6, further comprising a rotor shaft connecting said drive means to said rotor plate, and bearing support means disposed in the bottom of said hopper assembly, said bearing support means rotatably supporting a spherical bearing member having an aperture therethrough through which said rotor shaft extends, whereby said rotor shaft is self-aligning with respect to said wheel assembly.

8. A spreader according to claim 6, wherein said handle assembly includes two pairs of gripping portions, one pair of gripping portions being at an angle with respect to the other pair of gripping portions.

9. A spreader according to claim 8, wherein the gripping portions of one of said pair of gripping portions are parallel with respect to one another.

10. A spreader for dispensing soil-treating materials comprising, a handle assembly, a hopper assembly and a base assembly, a dispensing means disposed at the bottom of said hopper assembly, an axle assembly having a pair of wheels supported by said base assembly, a drive means connected to said axle assembly, a rotor shaft connecting said drive means to a rotor plate and being generally perpendicular to the axis of said axle assembly, and a bearing support means disposed in the bottom of said hopper assembly for rotatably supporting a spherical bearing member having an aperture therethrough through which said rotor shaft extends, whereby said rotor shaft is self-aligning with respect to said axle assembly should a non-perpendicular condition exist between the axis of said axle assembly and said rotor shaft.

* * * * *